(12) United States Patent
Mori et al.

(10) Patent No.: US 7,225,686 B2
(45) Date of Patent: Jun. 5, 2007

(54) TORQUE SENSING APPARATUS

(75) Inventors: Teruo Mori, Tokyo (JP); Toshihiro Suzuki, Tokyo (JP); Shiro Tomizawa, Tokyo (JP); Kesaharu Takatoh, Tokyo (JP)

(73) Assignee: TDK Corporation, Tokyo (JP)

( * ) Notice: Subject to any disclaimer, the term of this patent is extended or adjusted under 35 U.S.C. 154(b) by 139 days.

(21) Appl. No.: 11/070,003

(22) Filed: Mar. 3, 2005

(65) Prior Publication Data

US 2005/0204831 A1 Sep. 22, 2005

(30) Foreign Application Priority Data

Mar. 22, 2004 (JP) ............... 2004-083602
Mar. 22, 2004 (JP) ............... 2004-083604

(51) Int. Cl.
*G01L 3/00* (2006.01)
(52) U.S. Cl. ............... 73/862.331; 73/862.332
(58) Field of Classification Search ...............
73/862.331–862.339
See application file for complete search history.

(56) References Cited

U.S. PATENT DOCUMENTS

| | | | | |
|---|---|---|---|---|
| 5,589,645 A | * | 12/1996 | Kobayashi et al. | 73/862.335 |
| 5,831,180 A | * | 11/1998 | Tanaka et al. | 73/862.333 |
| 6,047,605 A | * | 4/2000 | Garshelis | 73/862.336 |
| 6,370,967 B1 | * | 4/2002 | Kouketsu et al. | 73/862.333 |
| 6,412,356 B1 | * | 7/2002 | Kouketsu et al. | 73/862.333 |
| 6,912,922 B2 | * | 7/2005 | Cheshmehdoost et al. | 73/862.333 |
| 2001/0035056 A1 | * | 11/2001 | Garshelis | 73/862.336 |
| 2005/0160835 A1 | * | 7/2005 | Masaki et al. | 73/862.333 |
| 2006/0179959 A1 | * | 8/2006 | Ouyang et al. | 73/862.331 |

FOREIGN PATENT DOCUMENTS

| | | |
|---|---|---|
| JP | A 05-005660 | 1/1993 |
| JP | A 07-113702 | 5/1995 |

* cited by examiner

*Primary Examiner*—Edward Lefkowitz
*Assistant Examiner*—Jermaine Jenkins
(74) *Attorney, Agent, or Firm*—Oliff & Berridge, PLC

(57) ABSTRACT

A torque sensor includes a substantially tubular giant magnetostrictive member, a shaft passing through the inner bore of the giant magnetostrictive member and capable of transmitting torque to the giant magnetostrictive member, and a detection coil for detecting changes in the magnetic permeability or remnant magnetization of the giant magnetostrictive member. Torque changes of the shaft are detected as changes in the magnetic permeability or remnant magnetization of the giant magnetostrictive member, based on the deformation of the giant magnetostrictive member. The torque sensor enables a reduction in the number of components and costs, as well as detection of torque changes with high sensitivity.

13 Claims, 11 Drawing Sheets

TORQUE SENSING APPARATUS

BACKGROUND OF THE INVENTION

1. Field of the Invention

The present invention relates to a torque sensor using a magnetostrictive member.

2. Description of the Related Art

Torque sensors using stress magnetic properties of a magnetostrictive member to detect changes in torque are commonly known.

One conventional torque sensor 1 shown in FIG. 21, for example, comprises a titanium alloy torque transmission shaft 2 and coils 3A, 3B concentrically wound around the shaft 2. Thin strips 4A, 4B of nickel-iron magnetic material having magnetostrictivity, which have undergone heat treatment to reduce the internal stress, are bonded on the torque transmission shaft 2 under an in-plane compressive stress (see Japanese Patent Laid-Open Publication No. Hei 5-5660).

The torque sensor 1 detects impedance changes of the coils 3A, 3B, which indicate changes in the magnetic properties of the magnetic thin strips 4A, 4B in accordance with torsional stress in the torque transmission shaft 2, to determine changes in the torque of the torque transmission shaft 2.

However, this conventional torque sensor 1 requires a bridge circuit or the like to enhance the detection sensitivity because the changes in the magnetic properties or the magnetostrictivity of the magnetic thin strips 4A, 4B are too small. The cost was accordingly high, and moreover, there was a limit to the improvement of detection sensitivity.

SUMMARY OF THE INVENTION

In view of the foregoing problems, various exemplary embodiments of this invention provide a torque sensor that can detect torque changes with high sensitivity while enabling reduction of the number of components and costs.

After an intensive research effort, the present inventors have devised a torque sensor that can detect torque changes with high sensitivity while enabling reduction of the number of components and costs.

(1) A torque sensor comprising: a substantially tubular magnetostrictive member; a shaft passing through an inner bore of the magnetostrictive member and capable of transmitting torque to the magnetostrictive member; and detecting means for detecting changes in magnetic permeability or remnant magnetization of the magnetostrictive member, wherein changes in torque of the shaft are detected as changes in magnetic permeability or remnant magnetization of the magnetostrictive member based on deformation of the magnetostrictive member.

(2) The torque sensor according to (1), wherein the magnetostrictive member is fitted to the shaft and fixed to an outer circumferential face of the shaft.

(3) The torque sensor according to (2), wherein the magnetostrictive member is fixedly bonded to the outer circumferential face of the shaft by an adhesive.

(4) The torque sensor according to (2), wherein the magnetostrictive member is fixed to the outer circumferential face of the shaft by either one of press-fitting and shrink-fitting.

(5) The torque sensor according to (4), wherein a resilient film is interposed between an inner circumferential face of the magnetostrictive member and the outer circumferential face of the shaft.

(6) The torque sensor according to (1), comprising: a substantially tubular magnetostrictive rod having the magnetostrictive member and fixed to a stationary part at one end; the shaft including a protruded part located at the other end of the magnetostrictive rod and having a larger diameter than the inside diameter of the magnetostrictive rod; and a resilient member for biasing the protruded part of the shaft toward the other end of the magnetostrictive rod, wherein torque is transmitted from the shaft to the magnetostrictive rod by a frictional force generated between the protruded part of the shaft and the magnetostrictive rod.

(7) The torque sensor according to (6), wherein the biasing force of the resilient member is adjustable.

(8) The torque sensor according to (6), wherein the protruded part of the shaft has a larger diameter than the outside diameter of the other end of the magnetostrictive rod.

(9) The torque sensor according to (6), wherein a resilient sheet is interposed between the protruded part of the shaft and the magnetostrictive rod.

(10) The torque sensor according to any one of (1) to (9), wherein a predetermined bias magnetic field is applied to the magnetostrictive member.

(11) The torque sensor according to any one of (1) to (9), wherein the detecting means includes a detection coil, and the changes in the magnetic permeability or remnant magnetization of the magnetostrictive member are detected as changes in inductance of the detection coil.

(12) The torque sensor according to (10), wherein the detecting means includes a detection coil, and the changes in the magnetic permeability or remnant magnetization of the magnetostrictive member are detected as changes in inductance of the detection coil.

(13) The torque sensor according to any one of (1) to (9), wherein the detecting means includes a hole element, and the changes in the magnetic permeability or remnant magnetization of the magnetostrictive member are detected as changes in electromotive force of the hole element.

(14) The torque sensor according to (10), wherein the detecting means includes a hole element, and the changes in the magnetic permeability or remnant magnetization of the magnetostrictive member are detected as changes in electromotive force of the hole element.

(15) The torque sensor according to any one of (1) to (9), wherein the detecting means includes a magnetic resistance element, and the changes in the magnetic permeability or remnant magnetization of the magnetostrictive member are detected as changes in electromotive force of the magnetic resistance element.

(16) The torque sensor according to (10), wherein the detecting means includes a magnetic resistance element, and the changes in the magnetic permeability or remnant magnetization of the magnetostrictive member are detected as changes in electromotive force of the magnetic resistance element.

(17) The torque sensor according to any one of (1) to (9), wherein the magnetostrictive member is a giant magnetostrictive member made of a giant magnetostrictive element.

(18) The torque sensor according to (10), wherein the magnetostrictive member is a giant magnetostrictive member made of a giant magnetostrictive element.

(19) The torque sensor according to (11), wherein the magnetostrictive member is a giant magnetostrictive member made of a giant magnetostrictive element.

The torque sensor according to the invention can detect torque changes with high sensitivity while enabling reduction of the number of components and costs. Moreover, the torque sensor can prevent breakage of the device and has higher strength against torque.

BRIEF DESCRIPTION OF THE DRAWINGS

Various exemplary embodiments of the present invention will be described in detail with reference to the accompanying drawings, wherein.

DETAILED DESCRIPTION OF THE PREFERRED EMBODIMENT

Torque sensors according to first to fifth exemplary embodiments of the present invention will be hereinafter described in detail with reference to the accompanying drawings.

Figure 1:
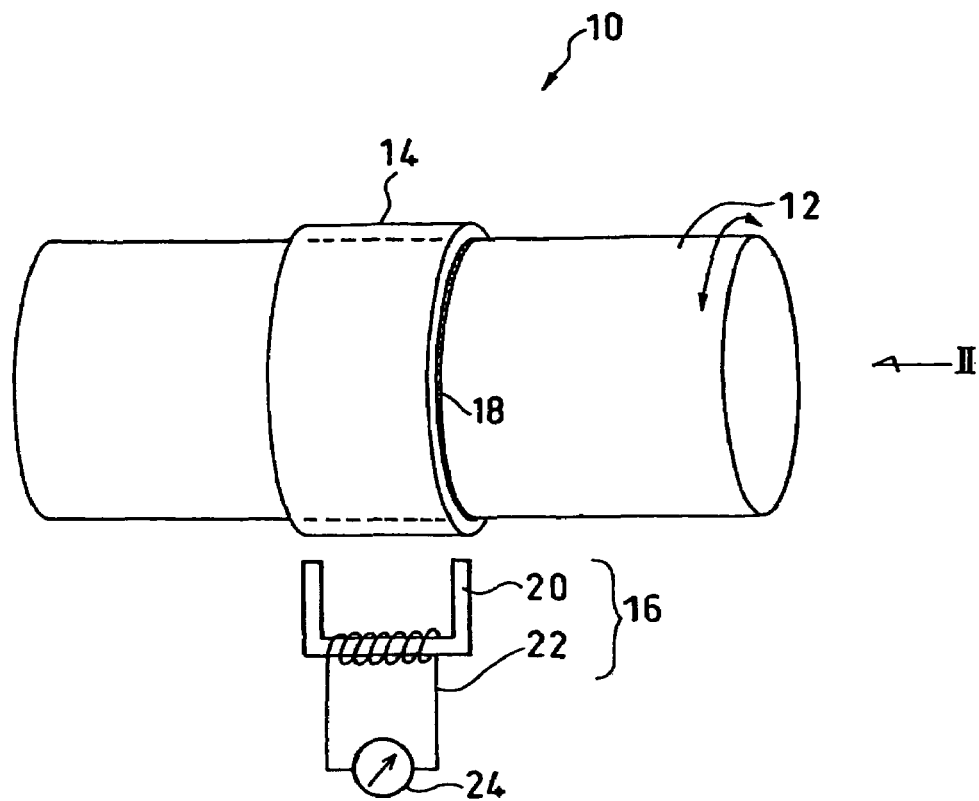
FIG. 1 is a schematic perspective view of the torque sensor according to a first exemplary embodiment of the invention.
Figure 2:
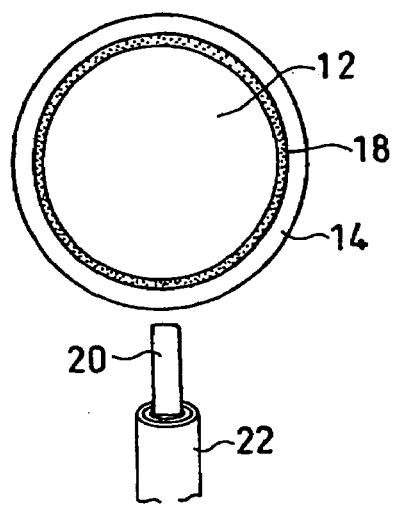
FIG. 2 is a schematic side elevation viewed from the direction of the arrow II of FIG. 1.

As shown in FIG. 1 and FIG. 2, the torque sensor 10 according to the first exemplary embodiment of the invention comprises a shaft 12, a substantially cylindrical giant magnetostrictive member 14 fixedly fitted on the outer circumference of the shaft 12, and a magnetic head 16 disposed in the close proximity to the giant magnetostrictive member 14.

The giant-magnetostrictive member 14 is fixedly bonded on the outer circumference of the shaft 12 using an adhesive 18. The giant magnetostrictive member 14 is made of a giant magnetostrictive element. The "giant magnetostrictive element" here refers to a magnetostrictive element made from a powder sintered alloy or a single-crystal alloy that is mainly composed of a rare-earth element and/or specified transition metal (for example, terbium, dysprosium, iron and the like). Deformation in this magnetostrictive element by an external force causes a large change in the magnetic permeability or remnant magnetization.

The magnetic head 16 is constructed with a generally square U-shaped core 20 disposed such that its open side faces the giant magnetostrictive member 14, and a detection coil (detecting means) 22 wound around the core 20.

The detection coil 22 detects inductance changes that indicate changes in the magnetic permeability or remnant magnetization of the giant magnetostrictive member 14 in accordance with its deformation. In this exemplary embodiment, the detection coil 22 measures the inductance by means of an LCR meter 24.

The operation of the torque sensor 10 according to the first exemplary embodiment is described below.

When the shaft 12 is twisted around its axis, a torque is transmitted to the giant magnetostrictive member 14 fixed on the outer circumference of the shaft 12. The torque causes deformation in the giant magnetostrictive member 14 and changes its magnetic permeability or remnant magnetization. Thus changes in torque of the shaft 12 are determined by detecting inductance changes of the detection coil 22, which indicate the changes in the magnetic permeability or remnant magnetization of the giant magnetostrictive member 14.

Figure 3:
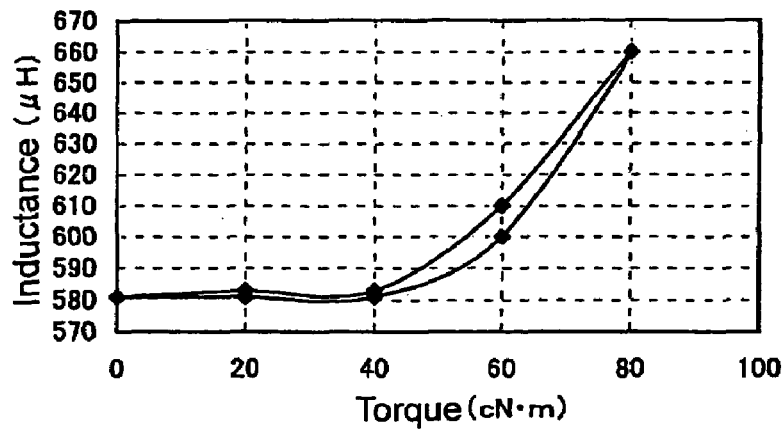
FIG. 3 is a graph showing the relationship between the torque of the shaft and the inductance of the detection coil in the torque sensor of the first exemplary embodiment.

The present inventors collected data regarding the relationship between the torque applied to the shaft 12 and the inductance of the detection coil 22. A cylindrical giant magnetostrictive member 14 with 6 mm outside diameter, 3 mm inside diameter, and 10 mm length was bonded onto a 3 mm diameter stainless steel shaft 12 using an epoxy adhesive 18 in the experiment. The detection coil 22 was 600 turns of 0.12 mm UEW (polyurethane enameled wire). The results, as shown in FIG. 3, indicated that the inductance of the detection coil 22 changed in accordance with changes in the torque applied to the shaft 12 in the torque range of from 0 to 80 cN·m for which data was collected.

According to this first exemplary embodiment, the torque sensor 10 comprises a substantially cylindrical giant magnetostrictive member 14 fixedly fitted on the outer circumference of the shaft 12, and a detection coil (detecting means) 22 for detecting changes in the magnetic permeability or remnant magnetization of the giant magnetostrictive member 14, and, changes in torque of the shaft 12 are determined as changes in the magnetic permeability or remnant magnetization of the giant magnetostrictive member 14, based on the deformation of the giant magnetostrictive member 14. This way, the magnetostrictive changes in the giant magnetostrictive member 14 are made large, and the torque changes of the shaft are detected with high sensitivity. Since a bridge circuit or the like used for the purpose of enhancing the detection sensitivity is unnecessary, the number of components is reduced as compared to conventional torque sensors, and cost reduction is readily achieved.

In particular, the giant magnetostrictive member 14 made of a giant magnetostrictive element enables further improvement of the torque change detection sensitivity.

The giant magnetostrictive member 14 is fixedly bonded on the outer circumference of the shaft 12 by the adhesive 18, and therefore, while the shaft 12 and the giant magnetostrictive member 14 are firmly coupled to each other, pressure in the radial direction from the shaft 12 is absorbed by the adhesive 18 and only a torque component is efficiently transmitted from the shaft 12 to the giant magnetostrictive member 14. In this respect, too, the torque change detection sensitivity is improved.

Next, the torque sensor according to the second exemplary embodiment of the invention will be described with reference to FIG. 4 to FIG. 6.

Figure 4:
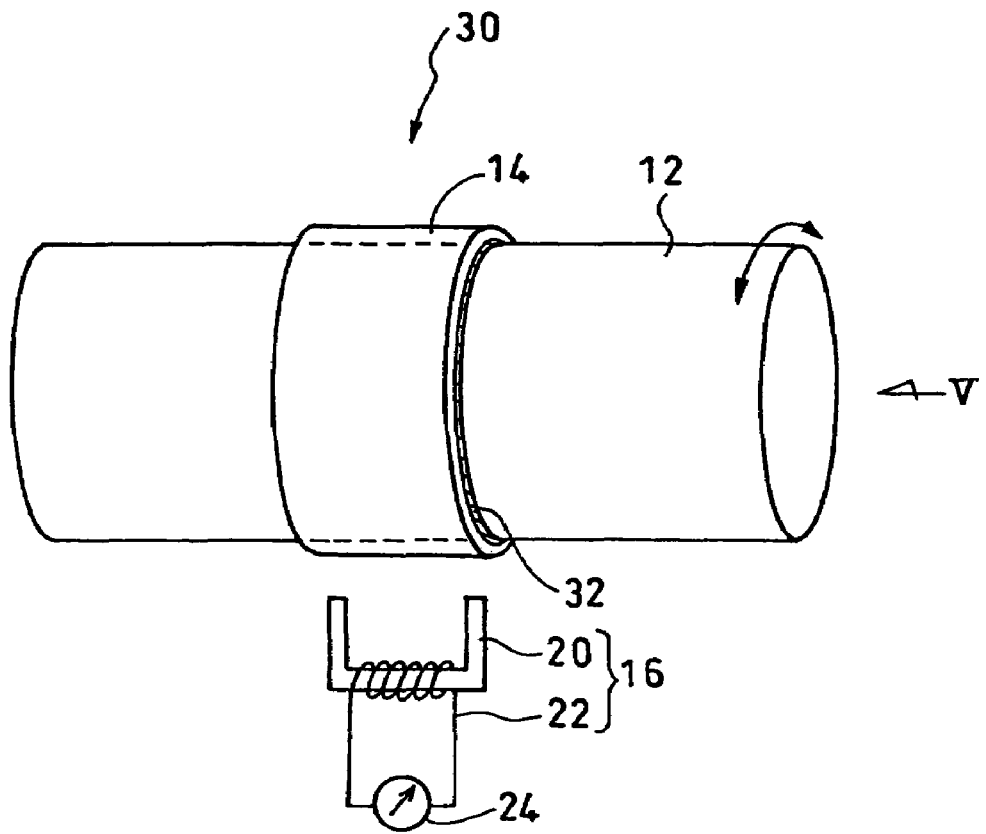
FIG. 4 is a schematic perspective view of the torque sensor according to a second exemplary embodiment of the invention.
Figure 5:
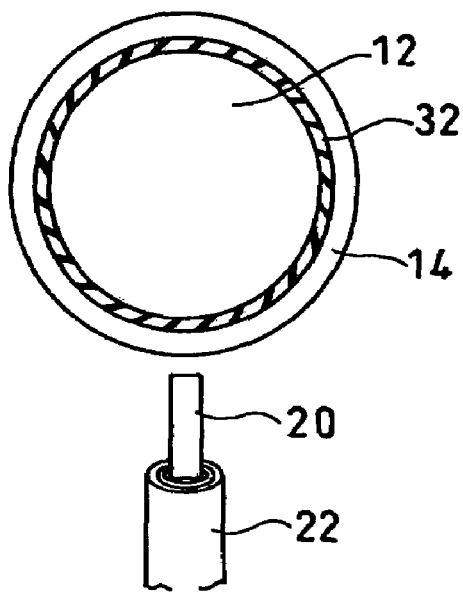
FIG. 5 is a schematic side elevation viewed from the direction of the arrow V of FIG. 4.
Figure 6:
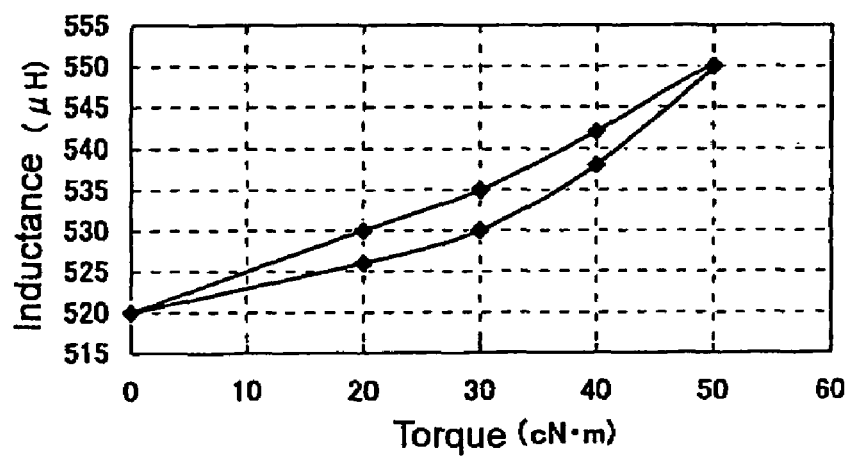
FIG. 6 is a graph showing the relationship between the torque of the shaft and the inductance of the detection coil in the torque sensor of the second exemplary embodiment.

In the torque sensor 30 according to the second exemplary embodiment shown in FIG. 4 and FIG. 5, the giant magnetostrictive member 14 is fixed on the outer circumference of the shaft 12 by press-fitting. Between the inner surface of the giant magnetostrictive member 14 and outer surface of the shaft 12 is interposed a resilient PE (polyethylene) film 32. As the other features are the same as the torque sensor 10 according to the first exemplary embodiment, the same elements are given the same reference numerals in the drawings and will not be described again.

Using the same shaft 12, giant magnetostrictive member 14, and detection coil 22 as the torque sensor 10 of the first exemplary embodiment, the present inventors collected data regarding the relationship between the torque applied to the shaft 12 of the torque sensor 30 and the inductance of the detection coil 22. The results, as shown in FIG. 6, indicated that the inductance of the detection coil 22 changed in accordance with the changes in the torque applied to the shaft 12 in the torque range of from 0 to 50 cN·m for which data was collected.

That is, with the torque sensor 30 according to the second exemplary embodiment, too, the torque changes of the shaft 12 are determined as the changes in the magnetic permeability or remnant magnetization of the giant magnetostrictive member 14, based on the deformation of the giant magnetostrictive member 14.

According to the second exemplary embodiment, since the giant magnetostrictive member 14 is fixed on the outer circumference of the shaft 12 by press-fitting, a predetermined preload is applied to the giant magnetostrictive member 14, because of which the torque sensor 30 has different properties from those of the torque sensor 10 according to the first exemplary embodiment. More specifically, the given preload applied on the giant magnetostrictive member 14 makes the change of the inductance of the detection coil 22 occur earlier than in the torque sensor 10. Thus, by providing both the torque sensors 10 and 30 according to the first and second exemplary embodiments, a user can selectively use one of them in accordance with the purposes of use.

The PE film (resilient film) 32 interposed between the inner surface of the giant magnetostrictive member 14 and outer surface of the shaft 12 absorbs pressure in the radial direction from the shaft 12 while efficiently transmitting only a torque component from the shaft 12 to the giant magnetostrictive member 14, whereby the torque change detection sensitivity is further improved.

While the giant magnetostrictive member 14 is fixed on the outer circumference of the shaft 12 by press-fitting in the second exemplary embodiment, the giant magnetostrictive member 14 may be fixed on the shaft 12 by shrink-fitting.

While a PE film 32 is interposed as a resilient film between the inner surface of the giant magnetostrictive member 14 and the outer surface of the shaft 12, the film may be formed of a PS (polystyrene) film, rubber, or any other resilient material.

Next, the torque sensor according to the third exemplary embodiment of the present invention will be described with reference to FIG. 7 to FIG. 9.

Figure 7:
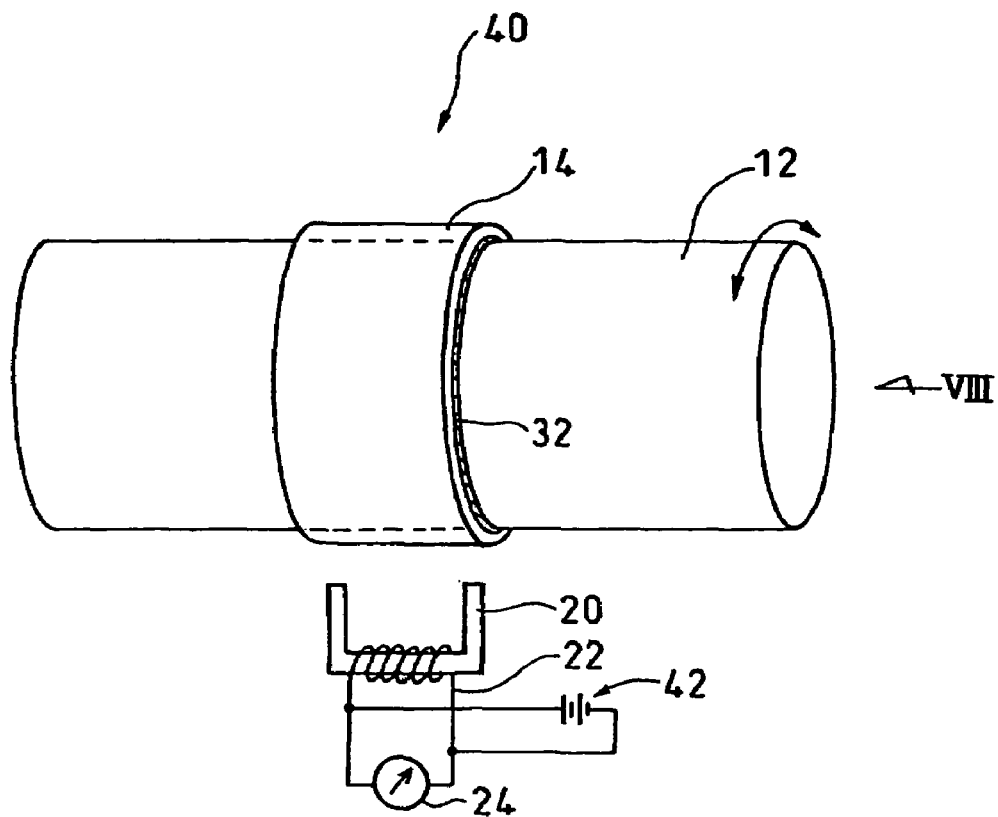
FIG. 7 is a schematic perspective view of the torque sensor according to a third exemplary embodiment of the invention.
Figure 8:
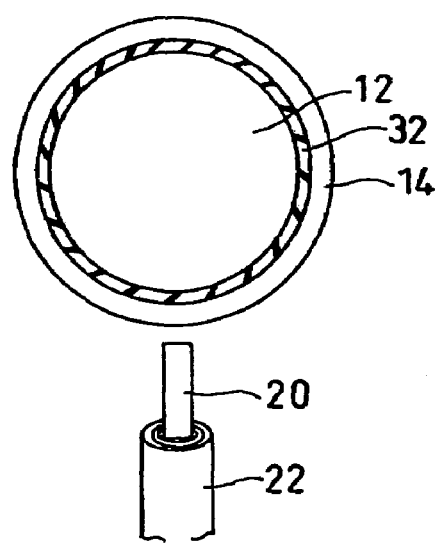
FIG. 8 is a schematic side elevation viewed from the direction of the arrow VIII of FIG. 7.
Figure 9:
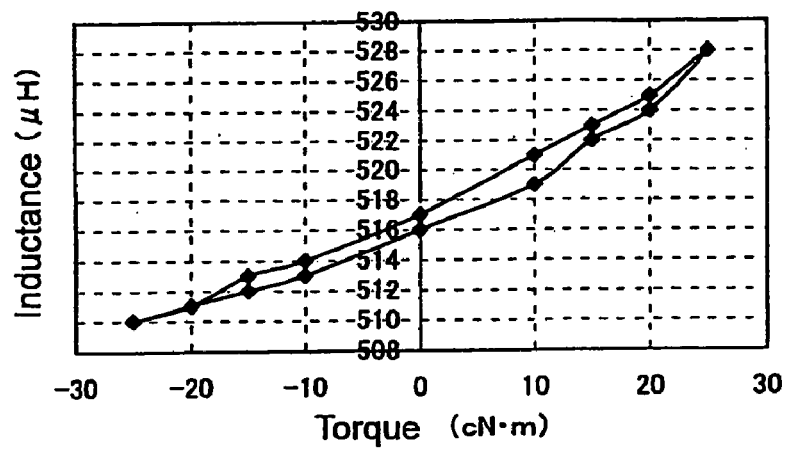
FIG. 9 is a graph showing the relationship between the torque of the shaft and the inductance of the detection coil in the torque sensor of the third exemplary embodiment.

In the torque sensor 40 according to the third exemplary embodiment shown in FIG. 7 and FIG. 8, a predetermined bias magnetic field is applied to the giant magnetostrictive member 14 by applying a fixed current to the detection coil 22 using a direct current power source 42. As the other features are the same as the torque sensor 30 according to the second exemplary embodiment, the same elements are given the same reference numerals in the drawings and will not be described again.

Using the same shaft 12, giant magnetostrictive member 14, and detection coil 22 as the torque sensor 10 of the first exemplary embodiment, the present inventors collected data regarding the relationship between the torque applied to the shaft 12 of the torque sensor 40 and the inductance of the detection coil 22. The results, as shown in FIG. 9, indicated that the inductance of the detection coil 22 increased from the reference point of 0 in the torque range of from 0 to 25 cN·m and decreased in the torque range of from 0 to −25 cN·m. This means that the inductance of the detection coil 22 increases when the shaft 12 is twisted in one direction, and decreases when the shaft 12 is twisted in the other direction.

That is, with the torque sensor 40 according to the third exemplary embodiment, because of the predetermined bias magnetic field applied to the giant magnetostrictive member 14, not only the torque changes of the shaft 12 but also the rotating direction of the shaft 12 are detected.

While the bias magnetic field is applied to the giant magnetostrictive member 14 by applying a fixed current to the detection coil 22 using a direct current power source 42 in the third exemplary embodiment, the bias magnetic field may be applied, for example, by providing a biasing magnet.

The torque sensor according to the invention should not be limited to the shape and structure of the above-described torque sensors 10, 30, 40 according to the first to third exemplary embodiments. For example, the giant magnetostrictive member 14 need not necessarily be cylindrical and may be square tubular.

In the first exemplary embodiment, the giant magnetostrictive member 14 is fixedly bonded on the outer circumference of the shaft 12 by the adhesive 18, and in the second and third exemplary embodiments, the giant magnetostrictive member 14 is fixed to the shaft 12 by press-fitting, with a PE film 32 interposed between the inner surface of the giant magnetostrictive member 14 and outer surface of the shaft 12, but the giant magnetostrictive member 14 may be directly fixed on the shaft 12.

Figure 10:
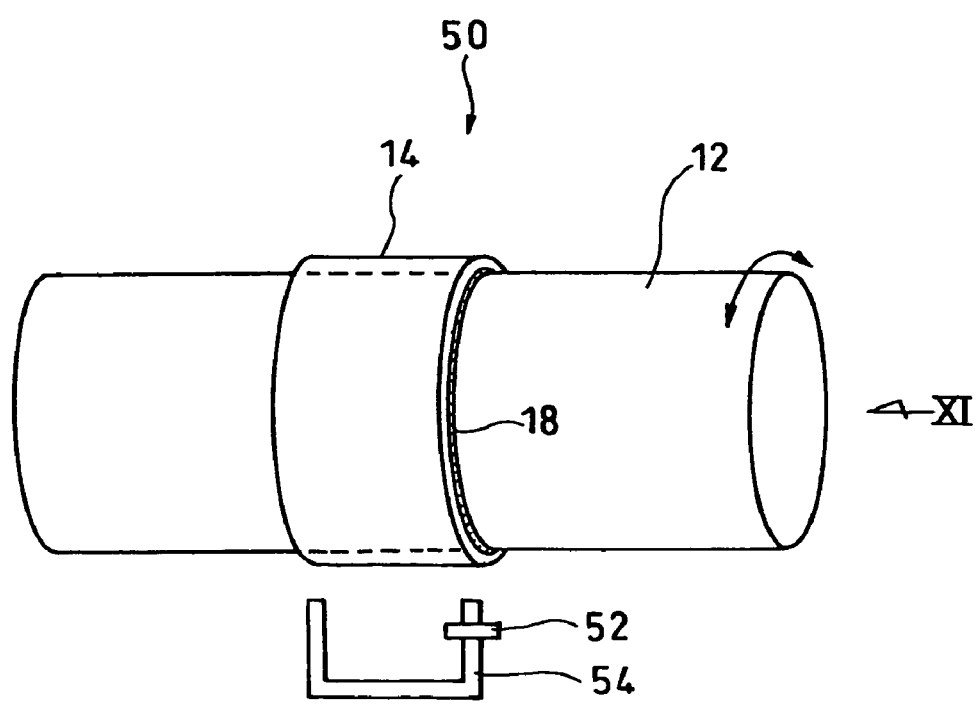
FIG. 10 is a schematic perspective view of the torque sensor in which a hole element or magnetic resistance element is used as the detecting means.
Figure 11:
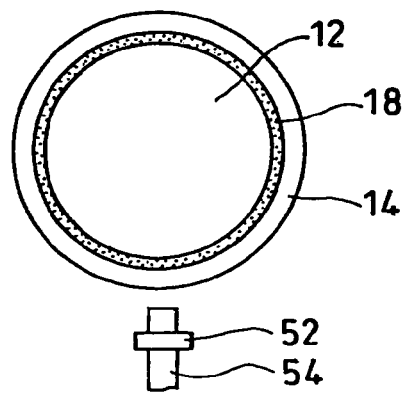
FIG. 11 is a schematic side elevation viewed from the direction of the arrow XI of FIG. 10.

The detecting means of the invention may be formed of members other than the detection coil, and for example, as with the torque sensor 50 shown in FIG. 10 and FIG. 11, a hole element 52 (or a magnetic resistance element such as MR or GMR) may be employed as the detecting means, and changes in the magnetic permeability or remnant magnetization of the giant magnetostrictive member 14 may be detected as changes in the electromotive force of the hole element (or magnetic resistance element) 52.

In applications where the torque sensor detection sensitivity need not be very high, a magnetostrictive member made of a magnetostrictive element may be used instead of the giant magnetostrictive member 14.

Next, the torque sensor according to the fourth exemplary embodiment of the invention will be described with reference to FIG. 12 to FIG. 18.

Figure 12:
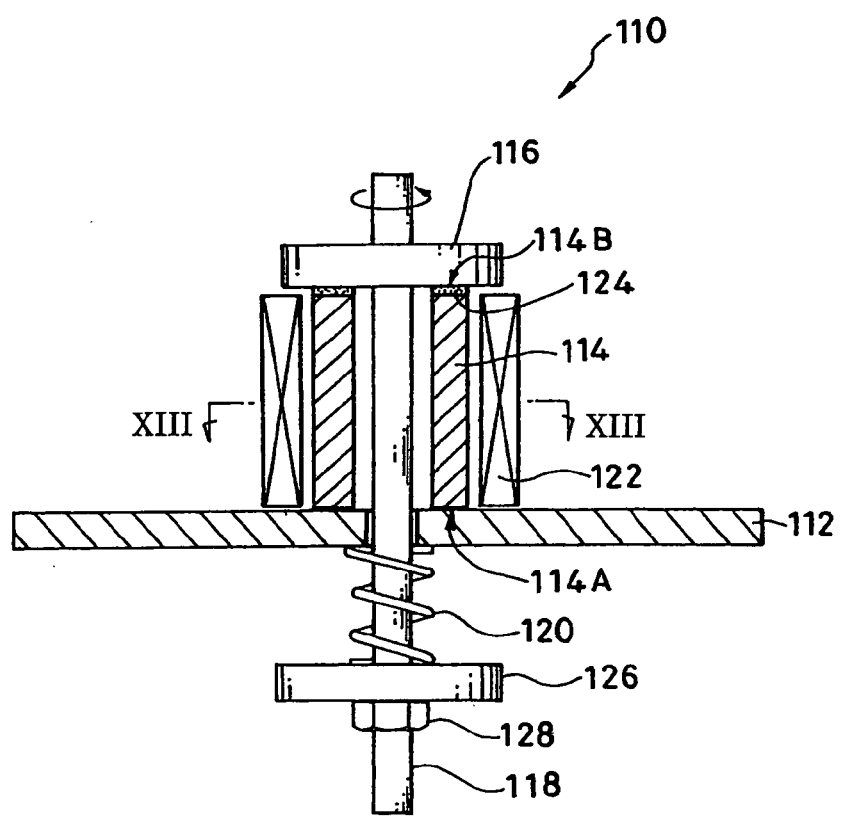
FIG. 12 is a schematic cross-sectional side view of the torque sensor according to a fourth exemplary embodiment of the invention.
Figure 13:
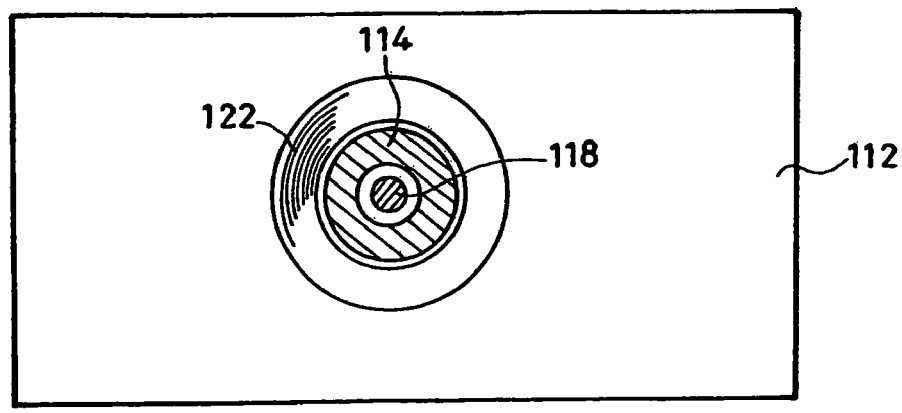
FIG. 13 is a schematic cross-sectional view taken along the line XIII—XIII in FIG. 12.

As shown in FIG. 12 and FIG. 13, the torque sensor 110 according to the fourth exemplary embodiment comprises a substantially cylindrical giant magnetostrictive rod 114, with its lower end 114A fixed on a base (stationary part) 112, a shaft 118 passing through the inner bore of the giant magnetostrictive rod 114 and having an upper plate (protruded part) 116 at the upper end 114B side of the rod, a spring (resilient member) 120 for biasing the upper plate 116 of the shaft 118 toward the upper end 114B of the giant magnetostrictive rod 114, and a detection coil (detecting means) 122 capable of detecting changes in the magnetic permeability or remnant magnetization of the giant magnetostrictive rod 114 based on the deformation of the giant magnetostrictive rod 114.

The giant magnetostrictive rod 114 is made of a giant magnetostrictive element.

The upper plate 116 disposed at the upper part of the shaft 118 is, in this exemplary embodiment, a substantially disc-like member having a larger diameter than the outside diameter of the upper end 114B of the giant magnetostrictive rod 114. Between the upper plate 116 of the shaft 118 and the upper end 114B of the giant magnetostrictive rod 114 is interposed a resilient sheet 124.

At the lower part of the shaft 118 is provided a lower plate 126, which has substantially the same shape as the upper plate 116 and is adjustable up and down along the shaft 118 by a nut 128. The spring 120 is set in a contracted state between the lower plate 126 and the base 112, so that the biasing force of the spring 120 is adjustable by moving the lower plate 126 up and down.

The detection coil 122 is disposed such as to surround the outer circumference of the giant magnetostrictive rod 114 and is capable of detecting changes in the magnetic permeability or remnant magnetization of the giant magnetostrictive rod 114.

The operation of the torque sensor 110 according to the fourth exemplary embodiment is described below.

When torque is applied to the shaft 118, the upper plate 116 fixed to the shaft 118 rotates with the torsion of the shaft 118. Since the upper plate 116 is biased toward the upper end 114B of the giant magnetostrictive rod 114 by the spring 120, the torque is transmitted from the shaft 118 to the giant magnetostrictive rod 114 by a frictional force generated between the upper plate 116 and giant magnetostrictive rod 114. This causes a torsion (deformation) in the giant magnetostrictive rod 114, based on which the magnetic permeability or the remnant magnetization of the giant magnetostrictive rod 114 changes. Thus torque changes of the shaft 118 are determined by detecting changes in the inductance of the detection coil 122, which indicate the changes in the magnetic permeability or remnant magnetization of the giant magnetostrictive rod 114.

Figure 14:
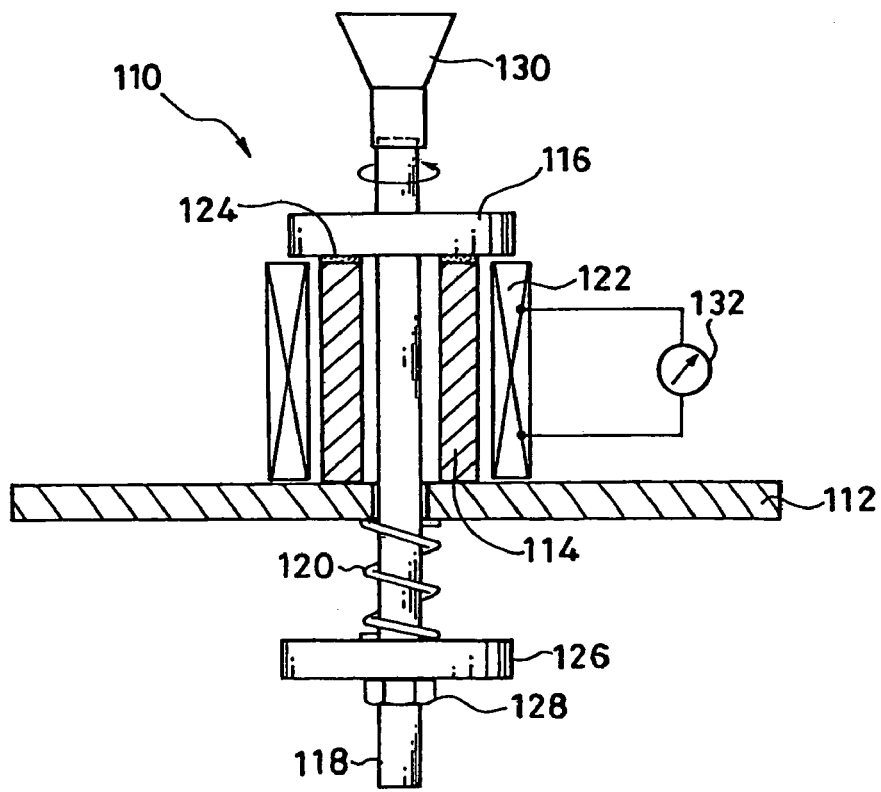
FIG. 14 is a cross-sectional side view illustrating a means of measuring torque and inductance for the torque sensor according to the fourth exemplary embodiment of the invention.

Using a torque measurement device 130 and an LCR meter 132 shown in FIG. 14, the present inventors collected data regarding the relationship between the torque applied to the shaft 118 of the torque sensor 110 and the inductance of the detection coil 122. A cylindrical giant magnetostrictive rod 114 with 8 mm outside diameter, 5 mm inside diameter, and 20 mm length, and a detection coil 122 of 200 turns of 0.2 mm diameter, 0.13 cm length UEW were used in the experiment. Between the giant magnetostrictive rod 114 and the upper plate 116 was interposed a Teflon (registered trademark) sheet as the resilient sheet 124.

Figure 15:
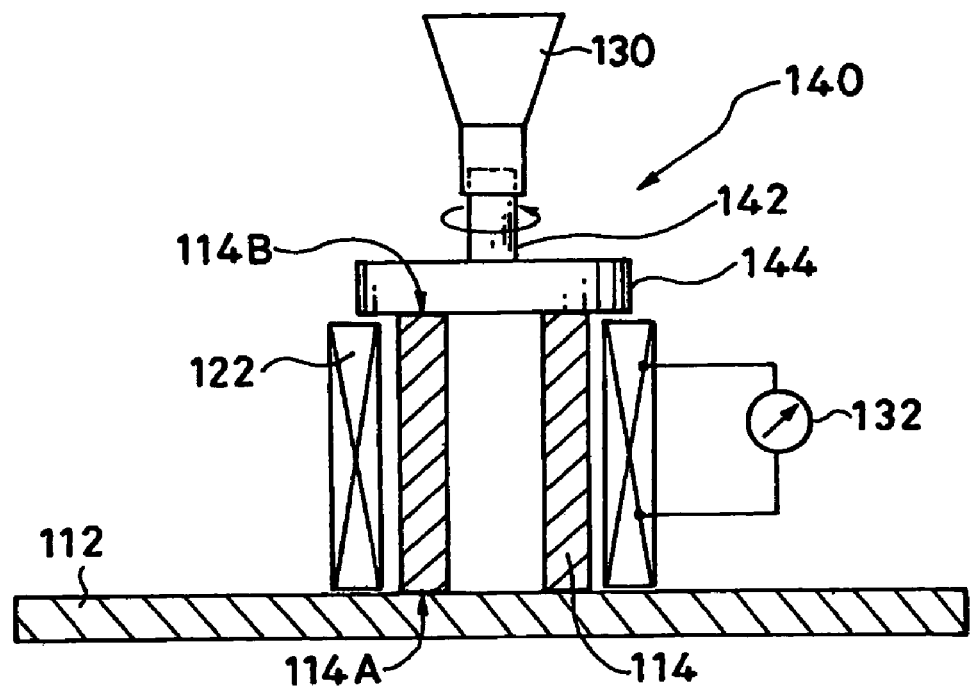
FIG. 15 is a cross-sectional side view showing means of measuring torque and inductance for a torque sensor according to a comparative example.

To make a comparison with the torque sensor 110 according to the fourth exemplary embodiment, same data was collected with respect to a torque sensor 140 according to a comparative example shown in FIG. 15. This torque sensor 140 according to the comparative example has a substantially disc-like plate 144 fixed to the shaft 142 and fixedly bonded to the upper end 114B of the giant magnetostrictive rod 114.

Figure 16:
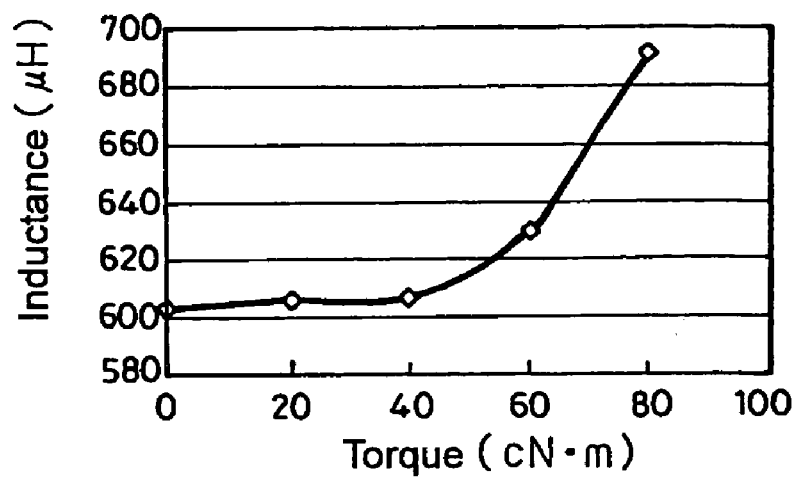
FIG. 16 is a graph showing the relationship between the torque and the inductance of the torque sensor according to the comparative example.

When torque was gradually increased from 0 cN·m, as shown in FIG. 16, the giant magnetostrictive rod 114 of the torque sensor 140 according to the comparative example broke when the torque exceeded about 80 cN·m.

Figure 17:
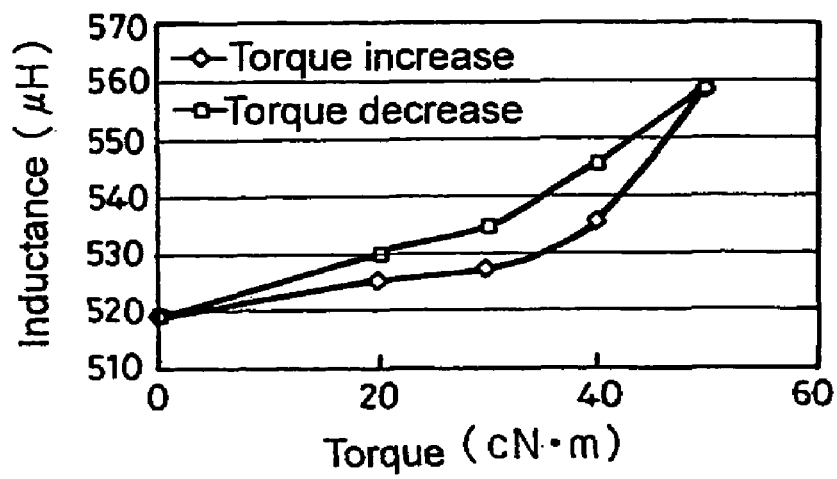
FIG. 17 is a graph showing the relationship between the torque and the inductance when a preload of 60 kg/cm$^2$ is applied to the torque sensor according to the fourth exemplary embodiment.
Figure 18:
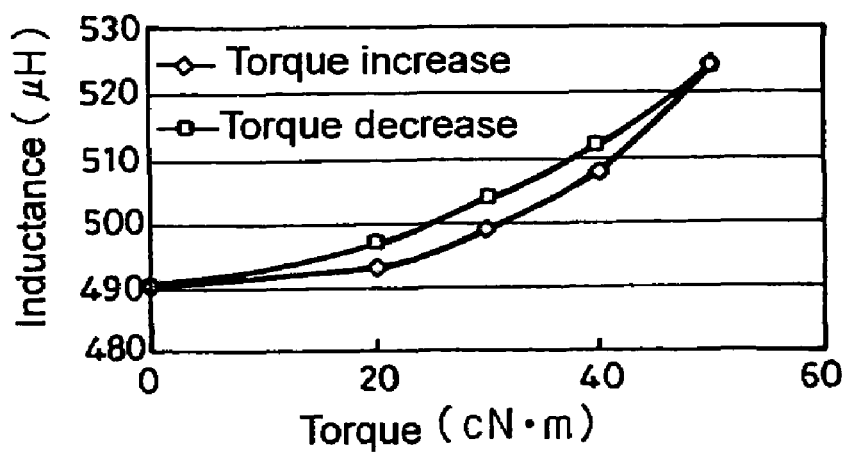
FIG. 18 is a graph showing the relationship between the torque and the inductance when a preload of 80 kg/cm$^2$ is applied to the same torque sensor.

On the contrary, with the torque sensor 110 according to the fourth exemplary embodiment, as shown in FIG. 17 and FIG. 18, even when a torque of more than 80 cN·m was applied, the maximum value of detected torque was suppressed to about 50 cN·m, and the giant magnetostrictive rod 114 did not break. This means that, while a torque of more than 80 cN·m was applied to the shaft 118, the frictional force between the upper plate 116 and the giant magnetostrictive rod 114 was exceeded by the restoring force of the giant magnetostrictive rod 114, resulting in slippage between the upper plate 116 and the giant magnetostrictive rod 114. Thus the torque exceeding 50 cN·m was not transmitted to the giant magnetostrictive rod 114. FIG. 17 shows the data when a preload of 60 kg/cm$^2$ was applied to the giant magnetostrictive rod 114, and FIG. 18 shows the data when a preload of 80 kg/cm$^2$ was applied to the giant magnetostrictive rod 114.

According to the fourth exemplary embodiment, the giant magnetostrictive member comprises: a substantially cylindrical giant magnetostrictive rod 114 made of a magnetostrictive member, with its one end 114A fixed on a base (stationary part) 112; the shaft 118 passing through the inner bore of the giant magnetostrictive rod 114 and including an upper plate (protruded part) 116 with a larger diameter than the inside diameter of the rod 114 at the other end 114B side of the rod 114; the spring (resilient member) 120 for biasing the upper plate of the shaft 118 toward the other end 114B of the giant magnetostrictive rod 114; and the detection coil (detecting means) 122 detecting changes in the magnetic permeability or remnant magnetization of the giant magnetostrictive rod 114 based on the deformation of the giant magnetostrictive rod 114. The torque is transmitted from the shaft 118 to the giant magnetostrictive rod 114 by a frictional force generated between the upper plate 116 of the shaft 118 and the giant magnetostrictive rod 114, so that the torque transmission from the shaft 118 to the giant magnetostrictive rod 114 is interrupted when the torque exceeds a predetermined threshold. Thus it is prevented that excessive torque is applied from the shaft 118 to the giant magnetostrictive rod 114, whereby breakage of the giant magnetostrictive rod 114 is avoided and the sensor can have higher strength.

Moreover, the torque sensor 110 can be fabricated more easily and at a lower cost than conventional torque sensors, and because of the substantially cylindrical giant magnetostrictive rod 114, the torque change detection sensitivity is improved.

In particular, the giant magnetostrictive rod 114 made of a giant magnetostrictive element enables further improvement of the torque change detection sensitivity.

Since the biasing force of the spring (resilient member) 120 is adjustable, the frictional force generated between the upper plate 116 and the giant magnetostrictive rod 114 can be changed, i.e., the torque amount that is transmitted from the shaft 118 to the giant magnetostrictive rod 114 is readily adjusted.

Furthermore, because the upper plate (protruded part) 116 of the shaft 118 has a larger diameter than the outside diameter of the other end 114B of the giant magnetostrictive rod 114, the contact area between the upper plate 116 and the giant magnetostrictive rod 114 is large. Therefore, torque is reliably transmitted from the shaft 118 to the giant magnetostrictive rod 114, whereby the torque change detection sensitivity is improved.

The resilient sheet 124 interposed between the giant magnetostrictive rod 114 and the upper plate 116 further ensures efficient transmission of only the torque component from the shaft 118 to the giant magnetostrictive rod 114, as the resilient sheet 124 absorbs pressure in the axial direction of the shaft 118.

Figure 19:
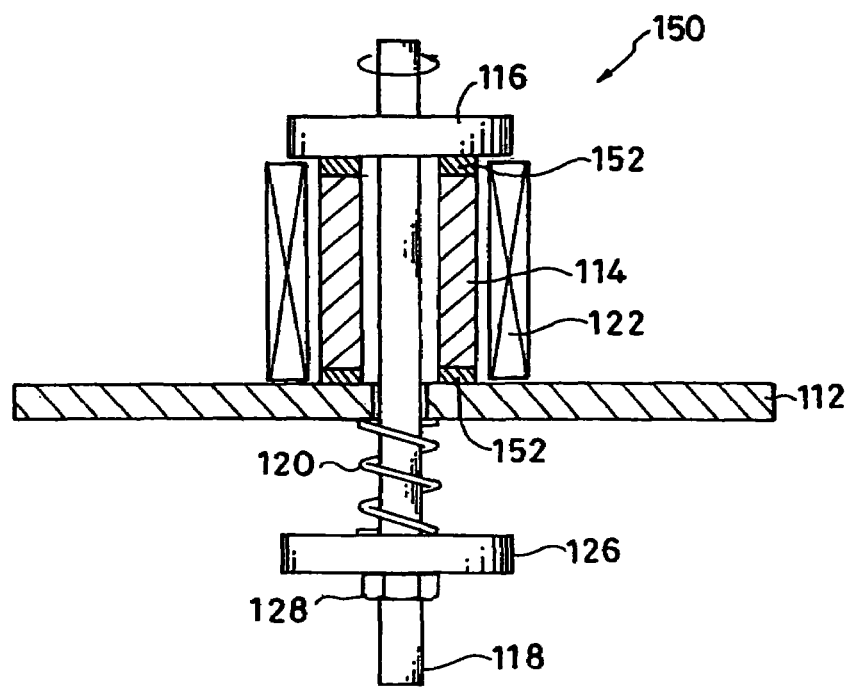
FIG. 19 is a schematic cross-sectional side view of the torque sensor according to a fifth exemplary embodiment of the invention.

Next, the torque sensor 150 according to the fifth exemplary embodiment of the invention will be described in detail with reference to FIG. 19.

As shown in the drawing, the torque sensor 150 according to the fifth exemplary embodiment includes a pair of magnets 152 disposed at both axial ends of the giant magnetostrictive rod 114 of the above-described torque sensor 110 according to the fourth exemplary embodiment, so as to apply a predetermined bias magnetic field to the giant magnetostrictive rod 114. The same elements as the torque sensor 110 according to the fourth exemplary embodiment are given the same reference numerals in the drawing and will not be described again.

With the torque sensor 150 according to the fifth exemplary embodiment, because of the predetermined bias magnetic field applied to the giant magnetostrictive rod 114, not only the torque changes of the shaft 118 but also the rotating direction of the shaft 118 are detected.

The torque sensor according to the invention may be any shape other than the shape and structure of the above-described torque sensors 110, 150 of the fourth and fifth exemplary embodiments. For example, the giant magnetostrictive rod 114 need not necessarily be cylindrical and may be square tubular.

While the protruded part of the shaft 118 is configured as the substantially disc-like upper plate 116 in the above described exemplary embodiment, the protruded part may be, for example, integrally formed with the shaft 118, or it may have a polygonal or any other shape. Further, the resilient member used in this invention should not be limited to the spring 120.

While the biasing force of the spring 120 is adjustable in the above described exemplary embodiment, the biasing force may be a fixed value, and the biasing force may be determined appropriately based on the torque load of the giant magnetostrictive rod 114.

Figure 20:
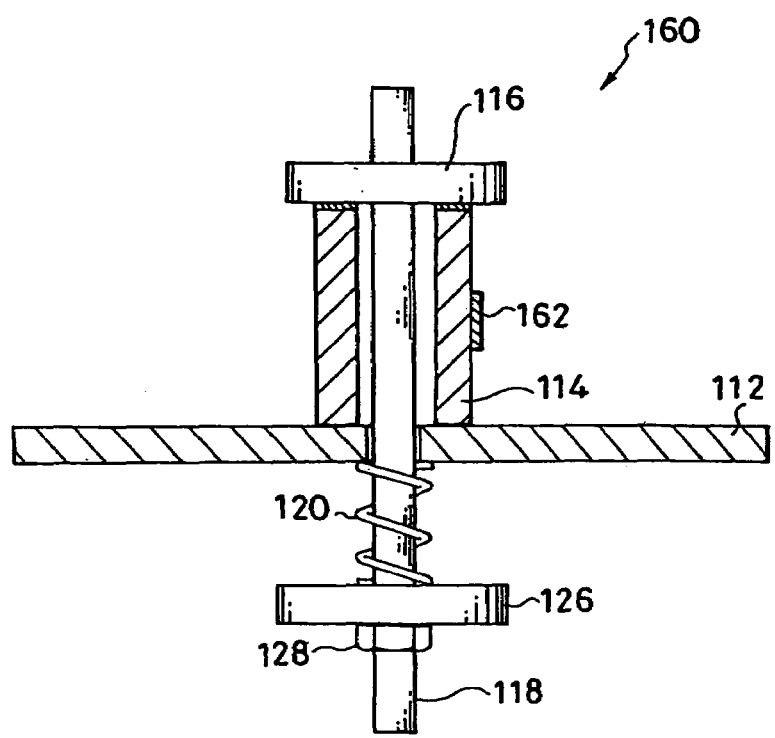
FIG. 20 is a cross-sectional side view of the torque sensor according to the fourth exemplary embodiment in which a magnetic resistance element is used as the detecting means.
Figure 21:
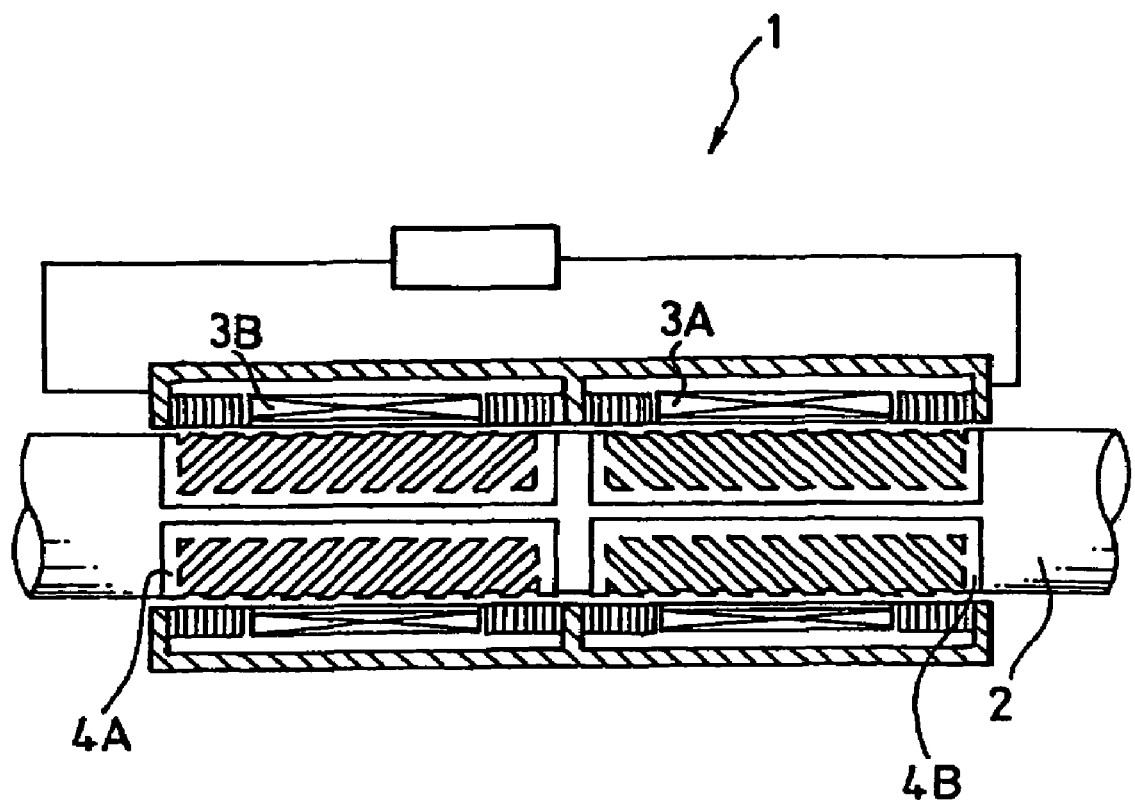
FIG. 21 is a schematic cross-sectional side view of a conventional torque sensor.

The detecting means of the invention may be formed of other members than the detection coil, and for example, as with the torque sensor 160 shown in FIG. 20, a hole element 162 (or a magnetic resistance element such as MR or GMR) may be employed as the detecting means, and the changes in the magnetic permeability or remnant magnetization of the giant magnetostrictive rod 114 may be detected as changes in the electromotive force of the hole element (or magnetic resistance element) 162.

In applications where the torque sensor detection sensitivity need not be very high, a magnetostrictive member made of a magnetostrictive element may be used instead of the giant magnetostrictive member.

What is claimed is:

1. A torque sensor comprising:
   a substantially tubular magnetostrictive rod having a magnetostrictive member and fixed to a stationary part at one end;
   a shaft passing through an inner bore of the magnetostrictive member, capable of transmitting torque to the magnetostrictive member and including a protruded part located at the other end of the magnetostrictive rod and having a larger diameter than the inside diameter of the magnetostrictive rod
   detecting means for detecting changes in magnetic permeability or remnant magnetization of the magnetostrictive member; and
   a resilient member for biasing the protruded part of the shaft toward the other end of the magnetostrictive rod, wherein
   torque is transmitted from the shaft to the magnetostrictive rod by a frictional force generated between the protruded part of the shaft and the magnetostrictive rod and changes in torque of the shaft are detected as changes in magnetic permeability or remnant magnetization of the magnetostrictive member based on deformation of the magnetostrictive member.

2. The torque sensor according to claim 1, wherein the biasing force of the resilient member is adjustable.

3. The torque sensor according to claim 2, wherein the detecting means includes a detection coil, and the changes in the magnetic permeability or remnant magnetization of the magnetostrictive member are detected as changes in inductance of the detection coil.

4. The torque sensor according to claim 2, wherein the detecting means includes a hole element, and the changes in the magnetic permeability or remnant magnetization of the magnetostrictive member are detected as changes in electromotive force of the hole element.

5. The torque sensor according to claim 2, wherein the detecting means includes a magnetic resistance element, and the changes in the magnetic permeability or remnant magnetization of the magnetostrictive member are detected as changes in electromotive force of the magnetic resistance element.

6. The torque sensor according to claim 2, wherein the magnetostrictive member is a giant magnetostrictive member made of a giant magnetostrictive element.

7. The torque sensor according to claim 1, wherein the protruded part of the shaft has a larger diameter than the outside diameter of the other end of the magnetostrictive rod.

8. The torque sensor according to claims 1, wherein a resilient sheet is interposed between the protruded part of the shaft and the magnetostrictive rod.

9. The torque sensor according to claim 1, wherein the detecting means includes a detection coil, and the changes in the magnetic permeability or remnant mag netization of the magnetostrictive member are detected as changes in inductance of the detection coil.

10. The torque sensor according to claim 9, wherein the magnetostrictive member is a giant magnetostrictive member made of a giant magnetostrictive element.

11. The torque sensor according to claim 1, wherein the detecting means includes a hole element, and the changes in the magnetic permeability or remnant magnetization of the magnetostrictive member are detected as changes in electromotive force of the hole element.

12. The torque sensor according to claim 1, wherein the detecting means includes a magnetic resistance element, and the changes in the magnetic permeability or remnant magnetization of the magnetostrictive member are detected as changes in electromotive force of the magnetic resistance element.

13. The torque sensor according to claim 1, wherein the magnetostrictive member is a giant magnetostrictive member made of a giant magnetostrictive element.

* * * * *